United States Patent [19]

McGinniss

[11] 4,037,018
[45] July 19, 1977

[54] CATIONIC AQUEOUS COMPOSITIONS OF POLYMER HAVING AMINE GROUPS, ACID NEUTRALIZED, AND A BIS-MALEIMIDE CROSS-LINKER, COATINGS AND PROCESS

[75] Inventor: Vincent Daniel McGinniss, Valley City, Ohio

[73] Assignee: SCM Corporation, New York, N.Y.

[21] Appl. No.: 702,340

[22] Filed: July 2, 1976

Related U.S. Application Data

[60] Continuation-in-part of Ser. No. 574,024, May 2, 1975, abandoned, which is a division of Ser. No. 519,409, Oct. 31, 1974, Pat. No. 3,925,181.

[51] Int. Cl.$^2$ .......................... C08J 3/06; C08K 5/34
[52] U.S. Cl. .................................. 428/418; 204/181; 260/18 N; 260/29.2 TN; 260/29.2 EP; 260/29.2 UA; 260/29.2 N; 260/29.6 HN; 260/837 R; 260/857 R; 260/859 R; 427/385 R; 428/425; 428/474; 428/500

[58] Field of Search ............... 260/29.2 N, 29.2 EP, 260/29.6 HN, 29.2 UA, 18 EP, 18 N; 526/50; 427/385; 428/418, 425, 474, 500

[56] References Cited

U.S. PATENT DOCUMENTS

| | | | |
|---|---|---|---|
| 3,652,511 | 3/1972 | Vincent et al. | 260/29.2 N |
| 3,738,967 | 6/1973 | Crivello | 260/29.2 N |
| 3,741,942 | 6/1973 | Crivello | 260/29.2 N |
| 3,766,138 | 10/1973 | Crivello | 260/29.2 N |
| 3,978,152 | 8/1976 | Grvffaz et al. | 260/29.2 EP |

*Primary Examiner*—Murray Tillman
*Assistant Examiner*—Arthur H. Koeckert
*Attorney, Agent, or Firm*—Jerry K. Mueller, Jr.

[57] ABSTRACT

A heat-curable coating composition contains a polymer having pendant amine groups and a bis-maleimide cross-linking agent in aqueous dispersion. The amine groups of the polymer are protonated to render the polymer water dispersible. The amine groups are adapted to become de-protonated for cross-linking with the bis-maleimide under heating to form a fully cured film. In a preferred embodiment, the coating composition serves as a cathodic electrocoating composition.

9 Claims, No Drawings

CATIONIC AQUEOUS COMPOSITIONS OF POLYMER HAVING AMINE GROUPS, ACID NEUTRALIZED, AND ABIS-MALEIMIDE CROSS-LINKER, COATINGS AND PROCESS

CROSS-REFERENCE TO RELATED APPLICATIONS

This application is a continuation-in-part of commonly assigned application U.S. Ser. No. 574,024, filed on May 2, 1975, now abandoned which is a divisional application of application U.S. Ser. No. 519,409, filed on Oct. 31, 1974, now U.S. Pat. No. 3,925,181.

BACKGROUND OF THE INVENTION

This invention relates to water-dispersed, heat-curable polymers in aqueous coatings and more particularly to cross-linking amine groups on the polymers with heat-reactive bis-maleimide.

The aqueous coatings containing a polymer having pendant amine groups and the bis-maleimide can be electrodeposited onto a cathode substrate and, can be employed as a cathodic electrocoating composition as described in co-pending application Ser. No. 574,024. The aqueous coatings also can be applied to a substrate by conventional techniques such as dipping, rolling, spraying, and like techniques. The applied film of the aqueous coating composition is heat-curable wherein the bis-maleimide cross-links the polymer, and such curing is independent of the particular method of application of the coating composition.

SUMMARY OF THE INVENTION

A heat-curable coating composition in aqueous dispersion for forming a heat-curable film on a substrate, comprising: a polymer having at least about 5% pendant primary and/or secondary amine groups, said amine groups being protonated with acid to render the polymer water dispersible, and at least about 5% by weight of said polymer of bis-maleimide cross-linking agent.

With conventional application of the composition, the applied film is heat-curable at a temperature sufficient to volatilize the water and said acid in said film, whereby said amine groups become de-protonated and said bis-maleimide cross-links said polymer through said de-protonated amine groups by addition polymerization to form a heat-cured film on said substrate.

With cathodic electrodeposition of the composition onto a cathode substrate, said protonated amine groups become de-protonated upon the electrodeposition of the polymer onto the cathode substrate, whereby the bis-maleimide cross-links the polymer through the de-protonated amine groups by addition polymerization to form a heat-cured, electrodeposited film on said cathode substrate.

DETAILED DESCRIPTION OF THE INVENTION

The reation mechanism by which cross-linking of the polymer through the bis-maleimide occurs is an addition polymerization reaction known as the Michael-type addition reaction, as more particularly described in "Organic Reactions," Vol. 10 (pages 719–555), John Wiley and Sons (1959), which is incorporated expressly herein by reference. The Michael-type addition reacts a primary or secondary amine group with an alpha-beta-ethylenically unsaturated carbonyl group in order to achieve linking of the amine group and the unsaturation of the ethylenically unsaturated carbonyl group. The alpha-,beta-ethylenic unsaturation of the bis-maleimides is used in the instant invention.

Th polymers contain pendant primary and/or secondary amine groups. By protonating amine groups, the polymer can be water dispersed. Electrodeposition of the polymer de-protonates the amine groups for cross-linking with the bis-maleimide cross-linking agent in a Michael-type addition reaction. Amine groups can be attached to the polymer by reacting free carboxyl groups on a polymer (polyester, acrylic, urethane, etc.) containing available carboxyl groups which can be reacted with alkyleneimine or substituted alkyleneimine, as proposed in U.S. Pat. Nos. 3,679,564 and 3,617,458, and incorporated herein by reference. Similarly, amine groups can be introduced into the polymer by reacting pendant carboxylic acid groups on a polymer with ethylene imine or derivatives of ethylene imine. Difunctional amine also can be reacted with reactive pendant carboxyl groups on the polymer.

Blocked amines also can be attached to the polymer and subsequently transformed into primary amine groups by an appropriate reaction which will be outlined in detail later herein. Such blocked amine groups can be attached to epoxy resins or acrylic resins having pendant oxirane groups by reacting a ketimine blocked diethylene triamine, formed from reacting diethylene triamine with an excess of methyl ethyl ketone, with the polymer. Such a reaction can be illustrated as follows:

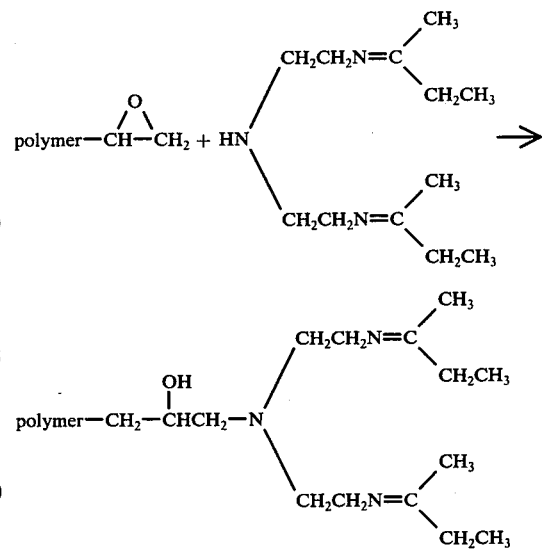

Similar blocked dialkyl triamines also can be employed to attach the blocked amine groups as above set forth. The primary and/or secondary amine groups are pendantly attached to the polymer. For purposes of this application, pendant amine groups include terminal amine groups. By pendantly attached is meant that such amine groups are attached to the polymer chain or to a pendant side chain of the polymer. The polymer containing pendant amine groups should contain at least about 5% by weight of such pendant amine groups, and up to about 50% if desired.

Representative polymers containing pendant amine groups can be derived from epoxy-modified diglycidyl ethers of bisphenol A structures, various aliphatic polyethylene or polypropylene glycol (diglycidyl ether)

adducts, and glycidyl ethers of phenolic resins, such epoxy resins being commerically available and commonly used in the electrocoating field. Other useful polymers containing pendant amine groups include polyamide resins, for example, condensation products of dimerized fatty acids coreacted with difunctional amine, such as ethylene diamine. Polyamide resins generally are between about 500 and about 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins. Various other useful polymers containing pendant amine groups can be advantageously employed in the electrocoating composition of this application as will become more apparent in the examples.

The cross-linking agent is a bis-maleimide having alpha-, beta-ethylenic unsaturation capable of being heat reactive to cross-link the amine groups on the polymer. Bis-maleimides are represented by the following general structure:

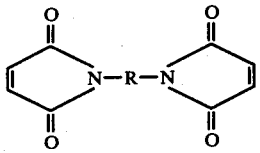

polymers having a molecular weight up to about 3,000.

Alkylene, aryl-bis-maleimides and combinations thereof are particularly useful as the cross-linking agent of this invention. Specific bis-maleimides which are particularly suited to the precepts of this invention can be selected from the group consisting of dimethylenedimaleimide, trimethylenedimaleimide, tetramethylenedimaleimide, pentamethylenedimaleimide, hexamethylenedimaleimide, heptamethylenedimaleimide, decamethylenedimaleimide; the bis-malemides of 4,4'-methylene-bis (ortho-chloroaniline), 4,4'-methylenedianiline, 4,4'-methylene-bis (3-nitroaniline), 4-aminophenylether; and N,N' -ortho-phenylenedimaleimide, N,N'-para-phenylenedimaleimide, and N-N'-meta-phenylenedimaleimide.

Bis-maleimides can be synthesized by various methods such as are disclosed in U.S. Pat. No. 2,444,536, and the same is incorporated expressly herein by reference. Generally, a diluted ether solution of diamine is added to a similar diluted ether solution of maleic anhydride which results in a maleamic acid. The maleamic acid can be disposed in acetic anhydride and converted into the corresponding bis-maleimide in the presence of potassium acetate.

In practicing this invention, the polymer is rendered water soluble by adding sufficient acid to the polymer to completely neutralize the polymer. Appropriate acids are, for example, proton-donating acids such as phosphoric, sulfuric, hydrochloric, acetic, formic, lactic, and other proton-donating organic and inorganic acids. Water solubility is achieved by the protonating of all (primary, secondary, and tertiary if there by any) amine groups of the polymer by the acid. The protonating of the amine groups of the polymer also renders the polymer positively charged so that during electrodeposition the polymer can migrate to the cathode substrate and to be deposited thereon. Also, while the pendant primary and/or secondary groups of the polymer are protonated, such amine groups will not react with bis-maleimide as the polymer is stable in water. A polymer having blocked amine groups is treated with a proton-donating acid in water in order to protonate all amine groups for water solubility of the polymer and to remove the blocking group from the pendant amine groups in order to convert such tertiary amine groups in protonated primary amine groups.

The neutralized polymer is blended with at least about 5% bis-maleimide cross-linking agent by weight of the polymer and up to about 50% if desired. The blend is then dispersed in water from about 5% to about 50% or greater non-volatile (solids) dispersion with about 5% to about 20% being preferred for an electrocoating bath of the composition. The aqueous coating composition is generally at about 60° to about 125° F., with about 70° to about 95° F. being preferred for electrocoating use of the composition.

The aqueous coating composition can be applied by conventional techniques such as, for example, brushing, rolling, spraying, dipping, and the like. The applied film of the coating composition then is heated at a temperature sufficient to volatilize the water and acid in the film. While mere evaporation of the acid and water at room temperature can be practiced, preferably the coated substrate is subjected to moderate heating of from about 100° F. to about 400° F. for about 5 to about 40 minutes. Such heating causes de-protonation or unblocking of the protonated amine groups of the polymer and the resulting de-protonated amine groups readily react with the bis-maleimide to cure the coating.

When the present composition is to be used as a cathodic electrocoating composition, the cathode substrate to be electrocoated is then immersed in the electrocoating bath while an electric potential is maintained therethrough as disclosed in U.S. Pat. No. 3,619,398, the same being incorporated herein by reference. During electrodeposition the positively charged polymer along with the bis-maleimide migrate to the cathode substrate. The protonated amine groups of the polymer become de-protonated (lose protons) due to the electric potential applied. The polymer and bis-maleimide are codeposited on the cathode substrate. The electric potential applied to the bath is generally between about 20 and above 500 volts, with about 50 to about 300 volts being preferred. The coated substrate is removed from the bath, washed with water to remove excess coating, and then conventionally heat-cured at a temperature of at least about 100° and preferably between about 200° and 400° F. for about 5 to about 40 minutes. The polymer cross-links through the de-protonated pendant primary and/or secondary amine groups attached to the electrocoated polymer. Water solubility and cross-linking of the polymer both occur through the same pendant amine groups of the polymer. The alpha-,beta-ethylenic unsaturation of the bis-maleimide is heat-reactive under the conditions of curing and readily reacts with the pendant amine groups of the polymer in Michael-type addition reaction or addition polymerization. Upon such heating a fully cured electrodeposited coating costs the cathode substrate.

The cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes. With conventional application of the coating, the substrate can be metal, wood, fiberboard, or the like. The electrocoating composition can contain opacifying pigments and inert extenders such as, for example, titanium dioxide, zinc oxide, clays such as kaolinite clays, silica, talc, and the like.

The following examples show how the instant invention can be practiced, but should not be constructed as limiting the invention. In the specification all parts are parts by weight, all percentages are weight percentages, and all temperatures are in degree Fahrenheit, unless otherwise expressly indicated.

EXAMPLE 1

One mole of DER 332 epoxy resin (Dow Epoxy Resin, epoxide equivalent weight 172-196, Dow Chemical Company) was reacted with 2 moles of cyclohexyl amine in 2-butoxy ethanol-1 solvent in order to attach pendant amine groups to the epoxy resin. The resin was completely neutralized with 2 moles of acetic acid. The bis-maleimide was 1,6 hexamethylene-bis-maleimide which was synthesized by reacting 1 mole of 1,6 hexamethylenediamine with 2 moles of maleic anhydride. The resin was blended with 100 grams of the bis-maleimide and added to water to form a 7% non-volatile dispersion.

A steel panel was immersed in the bath as the cathode and the electrocoating was electrodeposited thereon at 50 volts for 2 minutes. The coating panel was removed from the bath, washed with water, and baked at 360° F. for 15 minutes. A solvent-resistant coating covered the panel indicating that curing had taken place.

EXAMPLE 2

A polyester resin was prepared by reacting 1 mole of phthalic anhydride, 1 mole of succinic anhydride, and 1 mole of propylene glycol. Such reaction was carried out in toluene with azeotropic distillation of water. This reaction product, an acid-terminated polyester, then was reacted with 2 moles of hexmethylene diamine and the water removed to form a dimine-terminated polyester resin.

The amine resin next was completely neutralized with 6 moles of acetic acid and blended with 20% by weight of meta-phenylene-bis-maleimide. The blend was added to demineralized water to form a 10% non-volatile dispersion. A steel panel then was cathodically electrocoated in the electrocoating bath, washed with water, and baked at 250° for 40 minutes. Again, a fully cured electrodeposited coating covered the panel.

EXAMPLE 3

A polyamide resin was formulated by reacting 1 mole of succinic anhydride with two moles of hexamethylene diamine in toluene with removal of water by azeotropic distillation.

The diamine resin then was completely neutralized with 2.5 moles of acetic acid. The neutralized polymer was blended with 20% by weight of tetramethylene-bis-maleimide and this blend added to water to form a 10% non-volatile dispersion. A steel panel was cathodically electrocoated, washed with water, and baked at 360° for 30 minutes. A fully cured electrodeposited coating covered the panel upon such baking.

EXAMPLE 4

One mole of an epoxy resin (DER 664, epoxy equivalent weight of 900, Dow Epoxy Resin, Dow Chemical Company) was reacted at 60° C. with 2 moles of the ketimine blocked diethylene triamine of the specification,

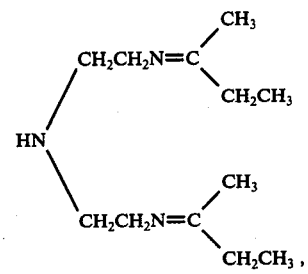

completely neutralized with 4 moles lactic acid, and blended with 20% N,N'- para-phenylenedimaleimide. The blend was then added to deionized water to form a 7% non-volatile (solids) dispersion.

This electrocoating composition was cathodically electrodeposited at 100 volts for 1 minute onto steel panels. The panels then were removed from the bath, washed with water, and baked at 300° for 30 minutes. A hard, flexible, solvent-resistant coating covered the steel panel.

EXAMPLE 5

The procedure of Example 4 was followed except that the N,N'-paraphenylenedimaleimide was omitted from the blend. The electrocoated steel panels upon baking did not have a solvent-resistant coating thereon, indicating that the electrocoating had not cured.

EXAMPLE 6

An acrylic resin was synthesized by the solution polymerization of 30% ethylacrylate, 20% styrene, 30% butyl acrylate, and 20% glycidyl methacrylate. This reaction was run under standard solution acrylic polymerization conditions using 2-butoxy ethanol-1 as the solvent and azobisisobutyl nitrile as the initiator.

The solution acrylic polymer contained pendant oxirane groups. The solution acrylic polymer was reacted with 15% of the ketimine blocked diethylene triamine of Example 4 to form an acrylic resin with pendant amine groups.

The amine-acrylic resin then was completely neutralized with 4 moles of lactic acid, blended with 20% N,N'-ortho-phenylenedimaleimide, and added to water to form an 8% non-volatile dispersion.

This electrocoating composition was cathodically electrodeposited onto steel panels in a manner similar to Example 4, washed with water, and baked at 400° for 25 minutes. A hard, flexible, fully cured, solvent-resistant coating covered the panels.

EXAMPLE 7

A methane resin was synthesized from the reaction of 1 mole of toluenediisocyanate and 1 mole of ethylene glycol. The diisocyanate-terminated resin was the reacted with 2 moles of the ketimine blocked diethylene triamine of Example 4. The amine resin was completely neutralized with 4. The amine resin was completely neutralized with 4 moles lactic acid and blended with 15% of hexamethylene-bis-maleimide. The electrocating bath was formed by adding the resin and bis-maleimide to water to form an 8% non-volatile dispersion.

The blend was cathodically electrodeposited onto a steel panel at 100 volts for 2minutes. The steel panel was then removed from the bath, washed with water, and baked at 400° for 10minutes. A fully cured electrodeposited coating covered the panel.

EXAMPLE 8

A polymer-bis-maleimide was prepared by reacting 2 moles a succinic anhydride with 1 mole of polyoxyethlene glycol (molecular weight of 1540). Which reaction product was further reacted with 2 moles of hexamethylene diamine. This polymer-diamine was dissolved in tetrahydrofuran (10% solution by weight) and then added to a solution of 2 moles of maleic anhydride (10% solution by weight in tetrahydrofuran) to form a polyether-bis-maleimide compound in the presence of acetic anhydride and of potassium acetate.

One mole of the epoxy resin of Example 4 (DER 664) was reacted at 60° C. with 2 moles of the ketimine blocked diethylene triamine of Example 4 followed by further reaction with 1 mole of linseed oil fatty acid. This resin was completely neutralized with 4 moles of acetic acid and blended with 50% polyether-bis-maleimide by weight of the resin. The blend was added to deionized water to form an 8% non-volatile dispersion.

This electrocoating composition was cathodically electrodeposited at 100 volts for 1 minute onto a steel panel. The panel was removed from the bath, washed with water, and baked at 400° for 35 minutes. A hard, flexible, solvent resistant coating covered the panel.

EXAMPLE 9

The neutralized resin of Example 8 (unsaturated oil-modified epoxy resin neutralized with acetic acid) was blended with 20% by weight 4,4'-methylene-bis-(orthochloroaniline). The blend was added to deionized water to form an 8% non-volatile dispersion.

This electrocoating composition was cathodically electrocoated and baked in a manner similar to Example 8. A hard, flexible, solvent resistant coating covered the panel.

EXAMPLE 10

An aqueous coating composition was formed from diethylene triamine and N,N'-para-phenylenedimaleimide (75/25 weight ratio) dispersed in water. An immediate exothermic reaction occurred as evidence by the aqueous dispersion becoming very viscous and by the heat evolved therefrom. The bis-maleimide was linking with the amine groups of the diethylene triamine because such amine groups were not protonated (blocked).

The aqueous coating composition was again prepared except that the diethylene triamine was completely neutralized with an excess of acetic acid and then added to the bis-maleimide and water. The aqueous coating composition then was allowed to stand for 24 hours at room temperature after which time the coating was still clear with no increase in viscosity detectable. The coating then was drawn down on a steel panel and the coated panel left to air dry room temperature. After about 8 hours the coating began to become viscous indicating that the acetic acid was evaporating from the film and the unblocked amine groups were being linked through the bis-maleimide. The film was completely cured after about 24 hours at room temperature.

EXAMPLE 11

One mole of the epoxy resin of Example 4 was reacted with 2 moles of the ketimine blocked diethylene triamine of Example 4, completely neutralized with an excess of acetic acid, and blended with 20% of N,N'-para-phenylenediamaleimide. The blend was added to deionized water to form a 30% non-volatile (solids) dispersion.

This dispersion was sprayed onto a steel panel and baked at 400° F. for 20 minutes. A fully cured, hard, solvent-resistant film on the panel resulted from such heating.

EXAMPLE 12

The amine-acrylic resin of Example 6 was prepared again, completely neutralized with 5 moles of acetic acid, blended with 20% N,N'-orthophenylenediamaleimide, and the blend added to water to form a 20non-volatile dispersion.

A steel panel was dipped into the dispersion to coat the panel and the coated panel baked at 400° F. for 20 minutes. A fully curved coating covered the panel upon the baking thereof.

EXAMPLE 13

A urethane resin was synthesized by reacting 2 moles of toluenediisocyanate and 1 mole of triethylene glycol followed by a further reaction with two moles of the ketimine blocked diethylene triamine of Example 4 in acetone. This urethane resin was completely neutralized with 5 moles of acetic acid, blended with 15% of hexamethylene-bis-maleimide and the blend dispersed in water to form a 30% non-volatile dispersion.

The dispersion (aqueous coating composition) was rolled onto a steel panel and the coated panel heated at 400° F. for 20 minutes, resulting in a hard, flexible film covering the panel.

EXAMPLE 14

The aqueous coating dispersion of Example 13 was prepared again with the addition of 5% by weight of a solution of benzoylperoxide/perbenzoic acid (equal parts by weight). The coating was applied to a steel panel and air dryed at room temperature for about 4 hours followed by heating at 200° F. for 20 minutes. An excellent, solvent-resistant film on the panel resulted from superimposing a peroxy catalyzed curing reaction along with the Michael-type addition polymerization cure with the bis-maleimide. Optionally, conventional melamine-cure reactions can be superimposed onto the bis-maleimide/amine cure of the coating composition of this application. Further, to any of the coating compositions of the Examples wherein the amine-functional polymer is hydroxyl bearing, can be added a multi-functional isocyanate, such as toluene diisocyanate, for example, and a urethane-cure superimposed onto the bis-maleimide/amine cure of the coating composition of this invention.

The foregoing examples demonstrate the advantages and uses of the instant composition for conventional coating operations and for cathodic electrodeposition operations. The bis-maleimide cross-linking agent uniquely contributes to the performance of the cured films of the coating composition as well as linking the polymers for curing of the film. The bis-maleimide cross-linking agent can be aliphatic, cycloaliphatic, aromatic, combinations thereof and polymeric by judicious selection of the reaction components utilized to synthesize the bis-maleimides of this invention. The polymers in the coating composition are chosen with regard only to selection of those polymers having the requisite performance charactaristics desired for the particular use being made of the coating composition provided that such polymers contain ther requisite amine functionality as described herein.

I claim:

1. A coating composition in aqueous dispersion for forming a heat-curable film thereof on a substrate, comprising:
   a polymer having at least about 5% by weight pendant primary and/or secondary amine groups, said amine groups being protonated with acid to render said polymer water-dis-persible; and
   at least about 5% by weight of said polymer of bis-maleimide cross-linking agent,
said bis-maleimide for cross-linking said polymer through said amine groups by addition polymerization to form a heat-cured film on said substrate.

2. The coating composition of claim 1 wherein said bis-maleimide is represented by the general structure:

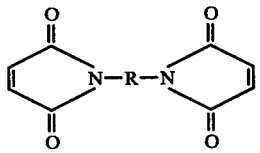

where R is alkylene, arylene, alkylene-arylene, or a polymer having a molecular weight up to about 3,000.

3. A substrate having thereon a heat-curable film of the coating composition of claim 1.

4. A substrate having thereon a heat-cured film of the coating composition of claim 1.

5. A heat-curable electrocoating composition containing a polymer having pendent amine groups and a cross-linking agent dispersed in an aqueous electrocoating bath for electrodeposition onto a cathode substrate disposed within said aqueous electrocoating bath, said polymer being cross-linkable upon subsequent heating of said electrocoated cathode substrate, the improvement comprising: said polymer having at least about 5% weight pendant primary and/or secondary amine groups, said amine groups being protonated with acid to render said polymer water dispersible in said bath, said amine groups adapted to become de-protonated upon electrodeposition of said polymer on said cathode substrate; and
   at least about 5% bis-maleimide cross-linking agent by weight of said polymer, said bis-maleimide for cross-linking said polymer by addition polymerization with said de-protonated pendant primary of secondary amine groups upon heating to form a heat-cured electrodeposited coating.

6. The electrocoating composition of claim 5 where said bis-maleimide is represented by the general stucture:

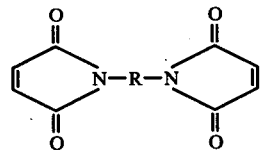

where R is alkylene, arylene, alkylene-arylene, or polymers havng a molecular weight up to about 3,000.

7. A cathode substrate having thereon a heat-curable electrodeposited coating of the electrocoating composition of claim 5.

8. A cathode substrate having thereon a heat-cured electrodeposited coating of the electrocoating composition of claim 5.

9. A process for coating a substrate with a film of a heat-curable coating composition in aqueous dispersion, comprising:
   applying said coating composition to said substrate to form said film thereon, said coating composition comprising a polymer having at about 5% by weight pendant primary and/or secondary amine groups, said amine groups being protonated with acid to render said polymer water-dispersible, and said coating composition comprising at least about 5% bis-maleimide cross-linking agent by weight of said polymer; and
   heating said substrate at a temperature sufficient to volatilize said water and said acid in said film, whereby said protonated amine groups become deprotonated and said bis-maleimide cross-linking said polymer through said deprotonated amine groups by addition polymerization to form a heat-cured film on said substrate.

* * * * *

UNITED STATES PATENT AND TRADEMARK OFFICE
CERTIFICATE OF CORRECTION

PATENT NO. : 4,037,018
DATED : July 19, 1977
INVENTOR(S) : Vincent Daniel McGinniss It is certified that error appears in the above-identified patent and that said Letters Patent are hereby corrected as shown below:

Column 1, line 22, after the word "and," insert -- thus, --; line 64, "719" should read -- 179 --.
Column 2, line 66, after the word "from" insert -- epoxy and --.
Column 3, line 30, before the word "polymers" insert -- where R is alkylene, arylene, alkylene-arylene, or --.
Column 4, line 45, replace the word "above" with -- about --.
Column 5, line 6, replace the word "constructed" with -- construed --; line 26, after the word "electrocoating" insert -- composition --.
Column 6, line 61, delete the words "The amine resin was completely"; line 62 delete the words "neutralized with 4."
Column 7, line 8 should read -- lene glycol (molecular weight of 1540), which reaction--
Column 8, line 15 after "20" insert -- % --; line 19, replace the word "curved" with -- cured --

Signed and Sealed this

*First* Day of *November 1977*

[SEAL]

*Attest:*

RUTH C. MASON
*Attesting Officer*

LUTRELLE F. PARKER
*Acting Commissioner of Patents and Trademarks*